(12) United States Patent
Harada

(10) Patent No.: US 8,933,392 B2
(45) Date of Patent: Jan. 13, 2015

(54) ENCODER INCLUDING EXPOSED OPTICAL ELEMENTS AND SERVO MOTOR WITH A SEALED JOINING PORTION

(75) Inventor: Masanobu Harada, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 184 days.

(21) Appl. No.: 13/551,622

(22) Filed: Jul. 18, 2012

(65) Prior Publication Data

US 2013/0154447 A1    Jun. 20, 2013

(30) Foreign Application Priority Data

Dec. 20, 2011  (JP) .................................. 2011-277778

(51) Int. Cl.
  *G01D 5/34* (2006.01)
  *H01J 40/14* (2006.01)

(52) U.S. Cl.
  USPC ..................... 250/231.13; 250/239

(58) Field of Classification Search
  CPC .... G01D 5/34707; G01D 5/3473; G01D 5/28
  USPC ............. 250/231.13, 231.14, 231.17, 231.18, 250/230, 233, 236, 559.29, 239, 2, 37 R, 250/237 G; 356/614, 615, 616, 617, 423; 341/11, 13, 31
  See application file for complete search history.

(56) References Cited

U.S. PATENT DOCUMENTS

| 4,740,691 | A  | * | 4/1988 | Ushiyama ................. 250/231.13 |
| 6,115,326 | A  | * | 9/2000 | Puma et al. .................. 367/118 |
| 7,220,960 | B2 | * | 5/2007 | Ito ............................ 250/231.13 |

FOREIGN PATENT DOCUMENTS

JP          4816988 B1     11/2011

OTHER PUBLICATIONS

U.S. Appl. No. 13/368,340, Yoshida et al.

* cited by examiner

*Primary Examiner* — Georgia Y Epps
*Assistant Examiner* — Don Williams
(74) *Attorney, Agent, or Firm* — Mori & Ward, LLP

(57) ABSTRACT

An encoder includes a first substrate including a point light source that emits light onto reflective slits formed on a disc and a light-receiving element that receives light emitted from the point light source and reflected by the reflective slits, a second substrate onto which the first substrate is mounted, a lustrous connecting portion configured to electrically connect the first substrate and the second substrate, and a covering material configured to cover the connecting portion in the manner that the point light source and the light-receiving element are exposed.

17 Claims, 3 Drawing Sheets

ENCODER INCLUDING EXPOSED OPTICAL ELEMENTS AND SERVO MOTOR WITH A SEALED JOINING PORTION

CROSS-REFERENCE TO RELATED APPLICATION

The present application claims priority from Japanese Patent Application No. 2011-277778, which was filed on Dec. 20, 2011, the disclosure of which is incorporated herein by reference in its entirety.

BACKGROUND OF THE INVENTION

1. Field of the Invention

The present disclosure relates to an encoder and servo motor.

2. Description of the Related Art

There are known optical encoders that are reflective encoders, for example.

SUMMARY OF THE INVENTION

According to the first aspect of the disclosure, there is provided an encoder including a first substrate comprising a point light source that emits light onto reflective slits formed on a disc, and a light-receiving element that receives light emitted from the point light source and reflected by the reflective slits, a second substrate onto which the first substrate is mounted, a lustrous connecting portion configured to electrically connect the first substrate and the second substrate, and a covering material configured to cover the connecting portion in the manner that that the point light source and the light-receiving element are exposed.

According to the second aspect of the disclosure, there is provided a servo motor including a motor configured to rotate a shaft, and an encoder configured to detect a position of the shaft. The encoder includes a first substrate comprising a point light source that emits light onto a reflective slits formed on a disc connected to the shaft, and a light-receiving element that receives light emitted from the point light source and reflected by the reflective slits, a second substrate onto which the first substrate is mounted, a lustrous connecting portion configured to electrically connect the first substrate and the second substrate; and a covering material configured to cover the connecting portion in the manner that the point light source and the light-receiving element are exposed.

DESCRIPTION OF THE EMBODIMENTS

The following describes an embodiment with reference to accompanying drawings.

1. Servo Motor

Figure 1:
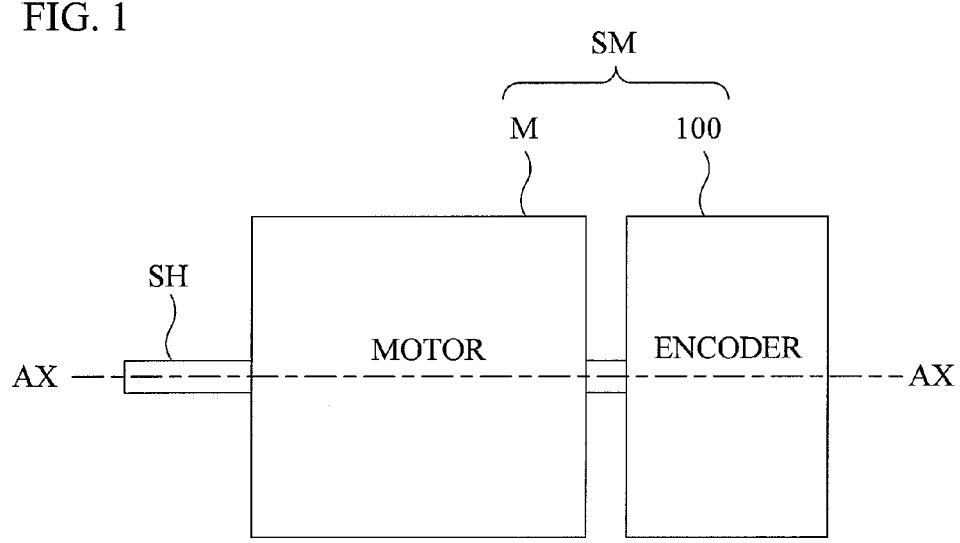
FIG. 1 is an explanatory view for explaining the general configuration of a servo motor according to the embodiment.

First, a general explanation of the configuration of the servo motor according to this embodiment will be described with reference to FIG. 1. As shown in FIG. 1, a servo motor SM comprises an encoder 100 and a motor M. The motor M is one example of a power generation source that does not include the encoder 100. While there are cases in which the motor M in and of itself is referred to as a servo motor, the configuration that includes the encoder 100 is referred to as the servo motor SM according to this embodiment. The motor M outputs a rotational force by rotating a shaft SH around a rotational axis AX.

Note that the motor M is not particularly limited as long as it is a motor controlled based on position data. That is, the motor M is not limited to an electrically operated motor that uses electricity as the power source, allowing use of a motor that is based on another type of power source, such as a hydraulic motor, pneumatic motor, or steam motor, for example. For ease of explanation, the following describes a case where the motor M is an electrically operated motor.

The encoder 100 connects the rotational force output end of the shaft SH of the motor M to the end portion on the opposite side. Then, the encoder 100 detects the position of the rotation target of the motor M (which may be the shaft SH itself) by detecting the position of the shaft SH, and outputs the position data that indicates that position.

Note that the disposed position of the encoder 100 is not particularly limited to the example shown in this embodiment. For example, the encoder 100 may be disposed so that it is directly connected to the output end side of the shaft SH, or so that it is connected to the shaft SH via another mechanism such as a reduction device, rotation direction converter, or break.

2. Encoder

Next, the general configuration of the encoder 100 will be described using FIG. 2 to FIG. 5. Note that FIG. 2 is a cross-sectional view of the encoder 100 shown in FIG. 3 across line A-A.

Figure 2:
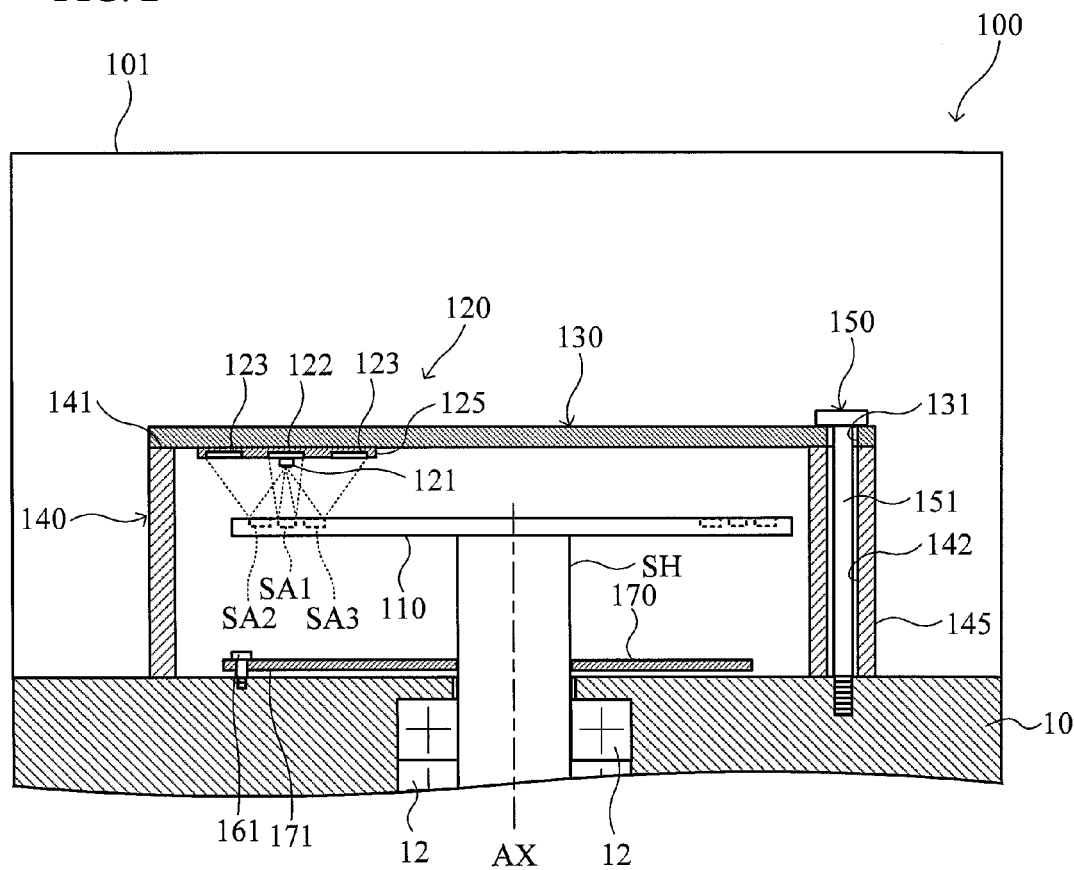
FIG. 2 is a cross-sectional view for explaining the general configuration of an encoder according to the embodiment.
Figure 3:
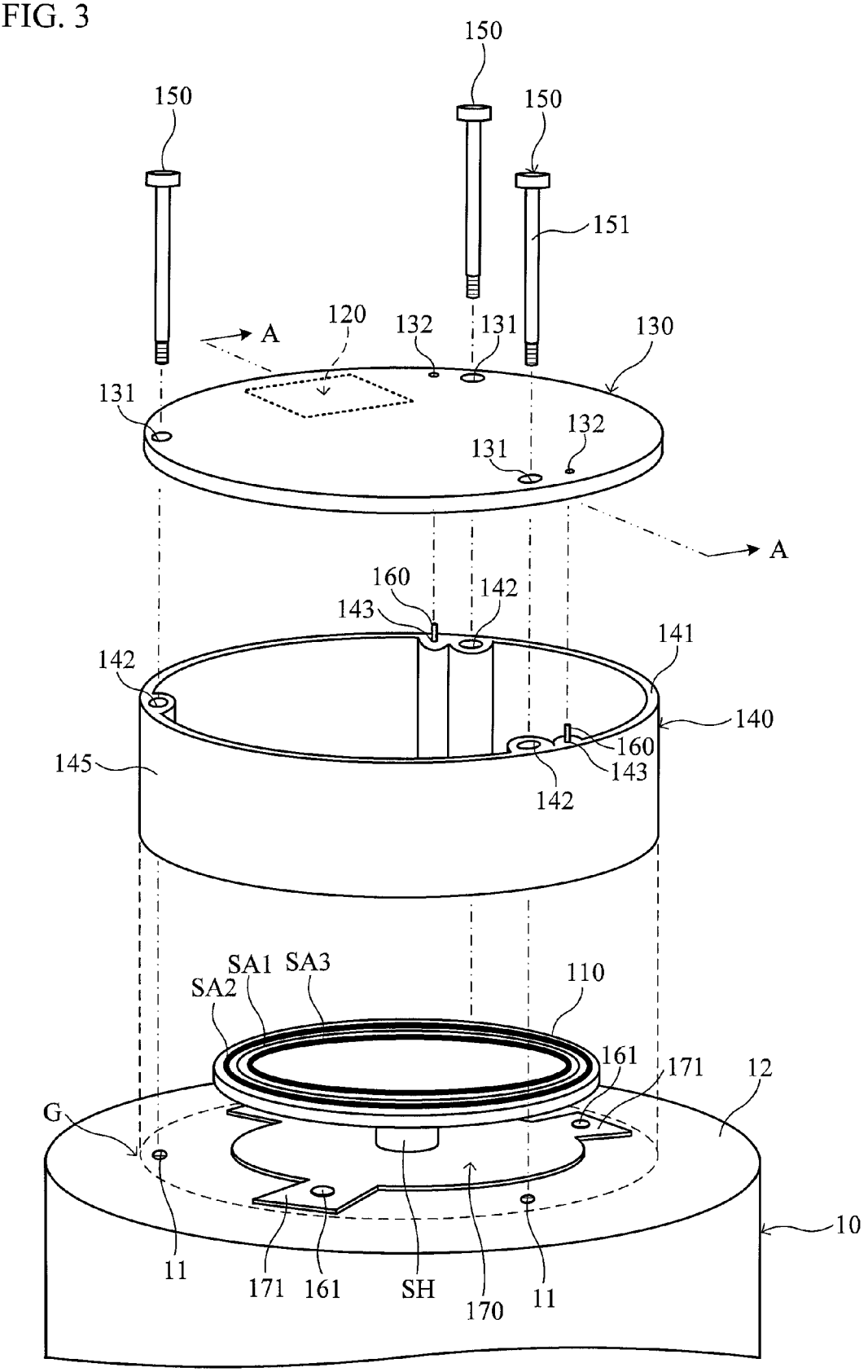
FIG. 3 is an exploded perspective view for explaining the general configuration of an encoder according to the embodiment.

As shown in FIG. 2, the encoder 100 according to this embodiment is provided to a housing 10 (a bracket on the opposite to the load side, for example) of the motor M, and covered by an encoder cover 101. As shown in FIG. 2 and FIG. 3, the encoder 100 comprises a flat, circular shaped disc 110 connected to the shaft SH, an optical module 120 disposed opposite the disc 110, a substrate 130 that mounts the optical module 120 to a surface on the side opposing the disc 110, and a cylindrical support member 140 that supports the substrate 130. The optical module 120 comprises a point light source 121 that emits light onto the disc 110, and light-receiving arrays 122 and 123 that receive the light emitted from the point light source 121 and reflected by the disc 110, and the encoder 100 is configured as a so-called reflective encoder.

2-1. Disc

The disc 110 is connected to the end portion of the shaft SH. Note that the disc 110 may be connected to the shaft SH via a hub, for example. As shown in FIG. 3, three concentric slit arrays SA1, SA2, and SA3 aligned around the circumference of the disc 110 along the circumferential direction and comprising a plurality of reflective slits (not shown) are formed on the surface of the disc 110, on the side opposing the optical module 120. Each of the reflective slits reflects the light emitted from the point light source 121. The slit array SA1 is disposed and configured so that the reflective slits comprise an incremental pattern. An incremental pattern is a pattern in which the reflective slits are regularly repeated at a predetermined pitch. This incremental pattern indicates the position of the rotation target of the motor M within one pitch or for each pitch, based on the sum of the detection signals of at least one or more light-receiving elements.

The slit arrays SA2 and SA3 are respectively positioned on the outside and inside of the slit array SA1 in the radial direction, and are disposed and configured so that the reflective slits form an absolute pattern. An absolute pattern is a pattern in which the position, ratio, or the like of the reflective slits within an angle opposing the optical module 120 described later is singly defined within a single rotation of the disc 110. When an absolute position is to be expressed by such an absolute pattern, the detection accuracy of the absolute position decreases in the area of change of a bit pattern caused by detection or non-detection of the light-receiving signal. For this reason, according to this embodiment, the same absolute pattern is offset by one-half the length of one bit, for example, in the circumferential direction, forming the two slit arrays SA2 and SA3.

The disc 110 is formed by glass, for example, according to this embodiment. Then, the reflective slits of the slit arrays SA1, SA2, and SA3 are formable by applying a member that reflects light to the surface of the disc 110 of glass. Note that the material of the disc 110 is not limited to glass, allowing use of metal, resin, or the like. Further, the reflective slit may be formed by using metal of a high reflectivity for the disc 110 and then reducing the reflectivity by creating a rough surface via sputtering, etc., on or applying a material with low reflectivity to the sections that are not to reflect light, for example. Note, however, that the material, manufacturing method, and the like of the disc 110 are not particularly limited.

2-2. Optical Module

Figure 4:
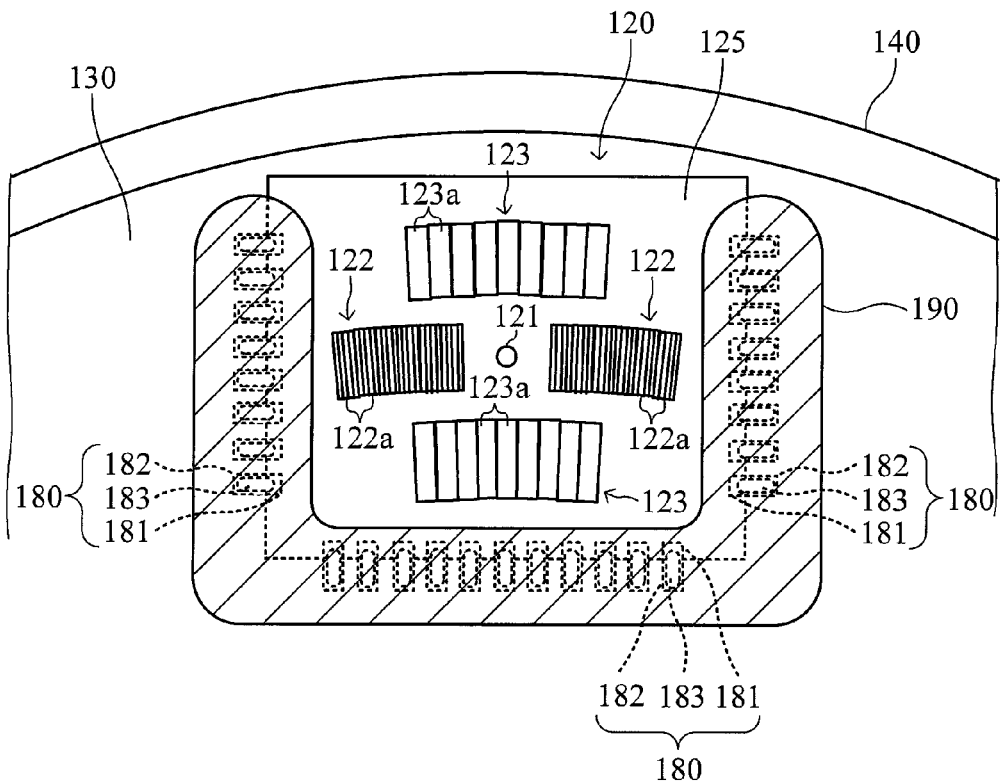
FIG. 4 is a diagram of the optical module mounting section of the substrate when supported by the support member, as viewed from the motor housing side.

The optical module 120 is mounted to the surface on the side of the substrate 130 that opposes the disc 110 so as to oppose the slit arrays SA1, SA2, and SA3 of the disc 110 in part, as shown in FIG. 2 and FIG. 3. This optical module 120 comprises a substrate 125, as shown in FIGS. 2 and 4. The point light source 121 that emits light onto the reflective slits formed on the disc 110, and the light-receiving arrays 122 and 123 that receive the light emitted from the point light source 121 and reflected by the reflective slits are provided to the surface on the side of the substrate 125 that opposes the disc 110. The light-receiving array 122 receives the light reflected from the slit array SA1 corresponding to the incremental pattern. The light-receiving array 123 receives the light reflected from the slit arrays SA2 and SA3 corresponding to the absolute pattern. Further, the substrate 125 is equivalent to an example of a first substrate.

The point light source 121 is disposed in a substantially central position of the optical module 120, and emits light to the slit arrays SA1, SA2, and SA3 that pass through opposing positions. The point light source 121 is not particularly limited as long as it is a light source capable of emitting light to an emission area, allowing use of a light emitting diode (LED), for example. Then, this point light source 121, in particular, is formed as a point light source in which an optical lens or the like is not disposed, emitting diffused light from the light emitting portion. Note that the point light source does not need to be a precise point and, needless to say, may be light emitted from a finite surface as long as the light source is regarded in terms of design and principles of operation as one that emits diffused light from a location that is substantially point shaped. Use of such a point light source makes deviation caused by optical elements unlikely to occur since the light is not focused or diffused by the optical elements, making it possible to increase the straightness of the light emitted to the slit arrays SA1, SA2, and SA3.

The light-receiving arrays 122 and 123 are disposed around the point light source 121. As shown in FIG. 4, the light-receiving array 122 is disposed on both sides of the disc 110 in the circumferential direction, with the point light source 121 therebetween, and the light-receiving array 123 is disposed on both sides of the disc 110 in the radial direction, with the point light source 121 therebetween. The light-receiving arrays 122 and 123 comprise a plurality of light-receiving elements 122a and 123a. The light-receiving elements 122a and 123a used are, for example, photodiodes formed in a thin film shape.

Note that while this embodiment has described an illustrative scenario in which the optical module 120 is made into a substrate-like form that can increase the thinness of the encoder 100 and can be easily manufactured, the optical module 120 does not necessarily need to be configured into a substrate-like form. Further, the disposed configuration of the light-receiving arrays 122 and 123 described above is one example, and is not limited thereto. For example, the configuration may comprise only the light-receiving array 122 corresponding to the incremental pattern and not the light-receiving array 123 corresponding to the absolute pattern. In such a case, the light-receiving array 122 may be provided to at least the inside or the outside of the light source 121 in the radial direction.

2-3. Substrate

The substrate 130 is a flat and circular printed-wiring substrate wherein a plurality of circuit elements and the like, including the optical module 120, is mounted onto the surface on the side that opposes the disc 110 as well as on the surface on the opposite side thereof, with a plurality of wires formed therebetween. Note that elements and wiring other than that of the optical module 120 are not shown in FIG. 2 to FIG. 4. As shown in FIG. 2, the substrate 130 is formed so that it has substantially the same diameter as the support member 140, and the edge portion thereof is mounted to a surface 141 to which the substrate of the support member 140 is mounted (hereinafter suitably referred to as "substrate mounting surface 141"). A plurality (three according to this embodiment) of through-holes 131 through which passes a fixing screw 150 is provided to the edge portion of the substrate 130. The through-holes 131 are disposed at a substantially equal interval (an interval of 120° according to this embodiment) in the circumferential direction. Further, at least two (two according to this embodiment) pin holes 132 through which is inserted a locating pin 160 are provided to the edge portion of the substrate 130. The pin holes 132 are provided through the substrate 130 and disposed adjacent to two of the three through-holes 131. As shown in FIG. 2 and FIG. 4, the optical module 120 is mounted near the edge portion of the substrate 130. Note that the substrate 130 is equivalent to an example of a second substrate.

2-4. Support Member

The support member 140 is formed into a cylindrical shape as shown in FIG. 2 and FIG. 3, houses the disc 110 in its interior, and supports the substrate 130 so that the optical module 120 opposes the reflective slits of the disc 110. The support member 140 is casted by a resin mold, etc., that uses a die, for example. The resin is preferably a black or colored material that readily absorbs light, making it possible to suppress the scattering or reflection of light inside the support member 140. Note that other resins may also be used by coating the interior in black or a color or pattern that readily absorbs light after molding.

The support member 140 comprises at least two (three according to this embodiment) through-holes 142 through which passes the fixing screw 150. The through-holes 142 are disposed at a substantially equal interval (an interval of 120° according to this embodiment) in the circumferential direction, in correspondence with the through-holes 131 of the substrate 130. At least two (three according to this embodiment) of the fixing screws 150 pass through the through-hole 131 of the substrate 130 and the through-hole 142 of the support member 140 in the axial direction of the shaft SH and screw into a screw hole 11 of the housing 10. With this arrangement, the substrate 130 and the support member 140 are fixed to the housing 10 of the motor.

As shown in FIG. 3, at least two (two according to this embodiment) pin holes 143 through which is inserted the locating pin 160 are provided to the substrate mounting surface 141 of the support member 140. The pin holes 143 are disposed adjacent to two of the three through-holes 142 so as to correspond with the pin holes 132 of the substrate 130. The locating pin 160 is first inserted into the pin hole 143 of the support member 140, and then inserted into the pin hole 132 of the substrate 130 in an erected state. With the locating pin 160 thus inserted into both the substrate 130 and the support member 140, the relative positions of the substrate 130 and the support member 140 in the planar direction orthogonal to the rotational axis AX are determined.

Note that the support member that supports the substrate 130 does not necessarily need to be cylindrical in shape. For example, there may be a plurality of pillar-shaped support members provided at an equal interval in the circumferential direction. Note, however, that, with the reflective encoder in this embodiment which is readily affected by external light, use of the cylindrical support member 140 capable of blocking external light is particularly more effective than a pillar-shaped support member which allows the entry of external light since the cylindrical member blocks external light and further suppresses the reflection and scattering of light by a connecting portion 180 described later, further reducing the noise in the light-receiving arrays 122 and 123.

2-5. Oil Seal

An oil seal 170 is provided between the disc 110 and the housing 10, covering the housing 10. As shown in FIG. 3, the shaft SH passes through the central portion of the oil seal 170, which comprises a plurality (three according to this embodiment) of fixing portions 171 that protrude outward in the radial direction to the outer periphery thereof. The fixing portions 171 are disposed at a substantially equal interval (an interval of 120° according to this embodiment) in the circumferential direction, and are each secured to the housing 10 by a screw 161. The oil seal 170 and the shaft SH are in close contact, suppressing grease leakage from the oil seal 170 even if the grease of a bearing 12 provided to the housing 10 forms a mist, spatters, and partially leaks from the gap between the housing 10 and the shaft SH to the encoder side, thereby improving the reliability of the encoder 100.

Further, the oil seal 170, as shown in FIG. 2, is formed up to at least the location corresponding to the point light source 121 with the disc 110 therebetween. The oil seal 170 is made of a material that absorbs light, such as black rubber or resin, for example. Note that any other material that absorbs light may be used as long as the material is coated in black or with a color or pattern that readily absorbs light, for example. With this arrangement, the oil seal 170 at least partially absorbs the light emitted from the point light source 121 (including transmitted light that transmitted through the disc 110 as well as scattered and reflected light), making it possible to suppress the scattering and reflection of light by the housing 10 within the support member 140. As a result, it is possible to suppress the impact of scattered and reflected light on the light-receiving array 122 and improve the detection accuracy of the encoder 100.

2-6. Connecting Portion and Covering Material

FIG. 4 is a diagram of the mounting section of the optical module 120 of the substrate 130 when supported by the support member 140, as viewed from the housing 10 side of the motor M. As shown in FIG. 4, the substrate 125 of the optical module 120 and the substrate 130 to which the substrate 125 is mounted are electrically connected via a plurality of connecting portions 180 disposed around the substrate 125. While the connecting portions 180 are disposed on both sides in the circumferential direction and on the inside in the radial direction of the substrate 125 according to the example shown in FIG. 4, they may further be disposed on the outside in the radial direction. Note that the mechanical connection of the substrate 125 and the substrate 130 is performed using screws, etc. (not shown). Each of the connecting portions 180 comprises a terminal 181 provided to the substrate 125, a terminal 182 provided to the substrate 130, and a joining portion 183 that is formed by soldering and joins the terminals 181 and 182. The terminals 181 and 182 are made of a metal conductor and the joining portion 183 is made of solder, thereby causing the connecting portion 180 to appear lustrous overall, resulting in high light reflectivity. Note that the terminal 181 is equivalent to an example of the first terminal, and the terminal 182 is equivalent to an example of the second terminal.

Figure 5:
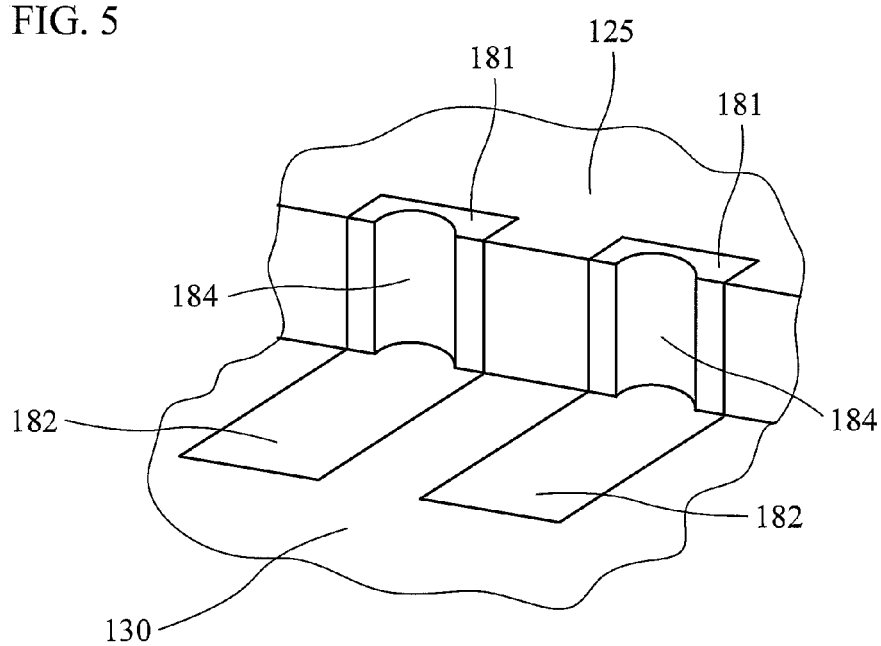
FIG. 5 is a perspective view for explaining the structure of the terminals of the substrate of the optical module as well as the terminals of the substrate to which the optical module is mounted.

The terminal 181 is provided in a plurality on the outer peripheral end surface of the substrate 125. Each of the terminals 181 are connected via a lead wire, etc., in the interior of the substrate 125 with the point light source 121 and the light-receiving elements 122a and 123a. Further, each of the terminals 181 comprises a concave portion 184 of a half-cylindrical shape, as shown in FIG. 5. On the other hand, the terminal 182 is formed into a thin film shape in a location corresponding to the terminal 181 on the front surface of the substrate 130. As shown in FIG. 5, with the terminal 181 of the substrate 125 provided on the terminal 182 of the substrate 130, solder is melted near the concave portion 184 and the melted solder is guided onto the terminal 182 by the concave portion 184. The joining portion 183 is thus formed from the concave portion 184 of the terminal 181 across to the terminal 182, joining the terminals 181 and 182. While the soldering is performed manually, for example, according to this embodiment, the workability of the soldering is improved since the concave portion 184 fulfills the role of guiding the melted solder at this time. Note that the joining portion 183 formed by the soldering is omitted in FIG. 5.

Note that the configuration of the connecting portion 180 is an example, and the present embodiment is not limited thereto. For example, a metal terminal of an arm shape may protrude outward from the outer peripheral end surface of the substrate 125 and join with the terminal 182 of the substrate 130 by soldering, or the terminals of the substrates 125 and 130 may be connected by soldering using a lead wire, etc. Further, a plurality of terminals may be formed on the surface opposing the substrate 130 of the substrate 125, for example, and a flip-chip joining method in which these terminals are directly connected with the terminals on the substrate 125 side by a solder bump formed on the terminal 182 of the substrate 130 may be used. Furthermore, a configuration in which soldering is not performed but rather the terminals of the substrates 125 and 130 are connected using a connector, for example, may be employed. Note that while soldering is performed manually according to this embodiment, the task may be performed automatically using a soldering device.

Further, as shown in FIG. 4, a covering material 190 is provided along the outer peripheral end surface (in a substantial leftward u-shape according to the example shown in FIG. 4), on both sides in the circumferential direction and near the outer peripheral end surface of the inside in the radial direction of the substrate 125. The covering material 190 exposes the point light source 121 and the light-receiving arrays 122 and 123 provided to the substrate 125, and covers the terminals 181 and 182 and the joining portion 183 of all of the plurality of connecting portions 180.

An adhesive, sealing agent, or resin material, for example, may be used as the covering material 190. The color of front surface of the covering material 190 is preferably a color or pattern that readily absorbs light, such as a lusterless black. With this arrangement, at least a portion of the light emitted from the point light source 121 (including the reflected light reflected by the disc 110 and the scattered light) can be absorbed, thereby preventing the covering material 190 itself from causing the light to scatter or reflect. Such coloring may be achieved by having the adhesive contain pigment, etc., in advance or by coating the front surface of the covering material 190. When an adhesive is used, the curing time can be shortened and a greater degree of freedom can be achieved in the manufacturing process by using an adhesive that cures by external factors, such as energy radiation such as ultraviolet radiation, heating, and moisture in the air, for example. Note that the covering material 190 does not necessarily need to be black. A dark color other than black (such as dark blue) may be used as well as even a material that is transparent or bright in color since the reflectivity can be decreased by covering the connecting portion 180, making it possible to achieve a certain effect related to the suppression of the reflection and scattering of light by the connecting portion.

Note that while the covering material 190 covers all of the plurality of connecting portions 180 according to this embodiment, it is possible to cover only a part of the connecting portions 180. For example, it is possible to employ a configuration that covers only the connecting portions 180 near the light-receiving array 123 corresponding to the absolute pattern having a relatively low resistance to noise (the connecting portions 180 provided to the outer peripheral end surface of the inside in the radial direction of the substrate 125), and does not cover the connecting portions 180 near the light-receiving array 122 corresponding to the incremental pattern having a relatively high resistance to noise (the connecting portions 180 provided to the outer peripheral end surface on both sides in the circumferential direction of the substrate 125). In this case, it becomes possible to achieve an effective noise countermeasure with a reduction in the amount of the covering material 190 used.

Further, while the covering material 190 covers all components of each of the connecting portions 180 according to this embodiment, the present embodiment allows a configuration wherein the covering material 190 covers part of the connecting portions 180, that is, at least one of the terminals 181 and 182 and the joining portions 183. For example, the covering material 190 may cover only the terminal 181 nearest to the light-receiving arrays 122 and 123, or the terminals 181 and 182 and the joining portions 183 that are made of a metal material of the highest reflectivity or that have the greatest surface area. In this case as well, it becomes possible to achieve an effective noise countermeasure with a reduction in the amount of the covering material 190 used.

3. Examples of Advantages of the Embodiment

According to the encoder 100 of this embodiment, the substrate 125 comprising the point light source 121 and the light-receiving arrays 122 and 123 and the substrate 130 to which the substrate 125 is mounted are electrically connected by the lustrous connecting portion 180. The connecting portion 180 is disposed around the substrate 125, disposing the connecting portion 180 and the light-receiving arrays 122 and 123 near each other. As a result, the light emitted from the point light source 121 and reflected by the slit arrays SA1, SA2, and SA3 of the disc 110 may be reflected and scattered by the connecting portion 180, potentially causing the scattered and stray light produced as a result to generate noise in the light-receiving arrays 122 and 123.

Here, the reflection and scattering of the light by the connecting portion 180 can be suppressed by covering the connecting portion 180 with the covering material 190, thereby reducing the noise of the light-receiving arrays 122 and 123. Furthermore, the covering material 190 does not cover but rather exposes the point light source 121 and the light-receiving arrays 122 and 123. If the point light source 121 and the light-receiving arrays 122 and 123 were covered and the covering material 190 was made out of a transparent material, for example, the diffraction and scattering of the light when the light passes through the covering material 190 would possibly lead to effects such as a decrease in the amount of light received. According to this embodiment, these items are exposed, thereby eliminating any such effect. As a result, the detection accuracy of the encoder can be improved. Further, the connecting portion 180 can be protected from elements such as external dust and moisture, achieving the advantage of suppressing corrosion as well.

Further, in particular, according to this embodiment, the connecting portion 180 comprises the terminals 181 and 182 and the joining portion 183 that joins these. Since the terminals 181 and 182, which are made of metal, and the joining portion 183 formed by soldering are all lustrous with high light reflectivity, covering these with the covering material 190 makes it possible to significantly suppress the reflection and scattering of light and reliably achieve a reduction in noise in the light-receiving arrays 122 and 123.

Furthermore, covering the joining portion 183 with the covering material 190 achieves the following advantages as well. That is, solder normally contains flux for improving wettability. When the residue of this flux adheres to the surface of the joining portion 183 after soldering, the flux activated by the heat when the motor is driven, etc., sometimes spatters, adhering to the disc 110. The adherence of such flux becomes particularly problematic with a reflective encoder, which is readily affected by fluctuations in the reflectivity of the reflective slits compared to a transmissive encoder, possibly leading to a decrease in the detection accuracy of the encoder. As a result, while the residue of the flux is normally removed using a dedicated lavage fluid, some components such as the substrate 125 of this embodiment cannot be cleaned when optical elements such as the point light source 121 are mounted thereto. According to this embodiment, the joining portion 183 is covered by the covering material 190, making it possible to seal the area even if the residue of the flux is activated, thereby preventing the flux from spattering. As a result, even in a case where cleaning cannot be performed, it is possible to reliably prevent a reduction in the detection accuracy of the encoder 100 caused by the spattering of the flux. Further, the advantage that cleaning is no longer required even in cleanable areas is achieved.

Further, in particular, according to this embodiment, the joining portion 183 is formed by manual soldering. As a result, variances in the shape of each of the joining portions 183 occur, making the surface shape thereof uneven, readily causing irregular reflection by the joining portion 183. Thus, such the joining portion 183 is covered by the covering material 190, making it possible to suppress the irregular reflection of the light and increase the noise reduction effect.

The above has described in detail embodiments while referring to accompanying drawings. Nevertheless, needless to say, the present embodiment is not limited to the examples of these embodiments. Various modifications and alternatives within the true spirit and scope defined in the claims will be apparent to those skilled in the art affiliated with the embodiments. Thus, it is intended that such techniques after these changes and modifications are naturally covered within the technical scope of these embodiments.

What is claimed is:

1. An encoder comprising:
   a first substrate comprising a point light source that emits light onto reflective slits formed on a disc, and a light-receiving element that receives light emitted from the point light source and reflected by the reflective slits;
   a second substrate onto which the first substrate is mounted;
   a lustrous connecting portion configured to electrically connect the first substrate and the second substrate; and
   a covering material configured to cover the connecting portion in the manner that the point light source and the light-receiving element are exposed, wherein:
   the connecting portion comprises a joining portion formed by soldering, and
   the covering material seals the joining portion.

2. The encoder according to claim 1, wherein:
   the connecting portion comprises:
      a first terminal provided to the first substrate;
      a second terminal provided to the second substrate; and
      the joining portion configured to join the first terminal and the second terminal, and
   the covering material covers at least one of the first terminal, the second terminal, and the joining portion.

3. The encoder according to claim 2, wherein:
   the joining portion is formed by manual soldering.

4. The encoder according to claim 1, wherein:
   the covering material is made of a black material.

5. The encoder according to claim 1, wherein:
   the covering material does not extend over the point light source.

6. The encoder according to claim 1, wherein:
   the covering material does not extend over the light-receiving element.

7. The encoder according to claim 6, wherein:
   the covering material does not extend over the point light source.

8. The encoder according to claim 1, wherein:
   the covering material does not cover the point light source.

9. The encoder according to claim 1, wherein:
   the covering material does not cover the light-receiving element.

10. The encoder according to claim 9, wherein:
    the covering material does not cover the point light source.

11. A servo motor comprising:
    a motor configured to rotate a shaft; and
    an encoder configured to detect a position of the shaft,
    the encoder including:
       a first substrate comprising a point light source that emits light onto a reflective slits formed on a disc connected to the shaft, and a light-receiving element that receives light emitted from the point light source and reflected by the reflective slits;
       a second substrate onto which the first substrate is mounted;
       lustrous connecting portion configured to electrically connect the first substrate and the second substrate; and
       a covering, material configured to cover the connecting portion in the manner that the point light source and the light-receiving element are exposed, wherein:
    the connecting portion comprises a joining portion formed by soldering, and
    the covering material seals the joining portion.

12. The servo motor according to claim 11, wherein:
    the covering material does not extend over the point light source.

13. The servo motor according to claim 11, wherein:
    the covering material does not extend over the light-receiving element.

14. The servo motor according to claim 13, wherein:
    the covering material does not extend over the point light source.

15. The servo motor according to claim 11, wherein:
    the covering material does not cover the point light source.

16. The servo motor according to claim 11, wherein:
    the covering material does not cover the light-receiving element.

17. The servo motor according to claim 16, wherein:
    the covering material does not cover the point light source.

* * * * *